United States Patent Office 3,167,422
Patented Jan. 26, 1965

3,167,422
METHOD OF PRODUCING GALLIUM FROM THE RESIDUES FROM CHEMICAL PRODUCTION OF ALUMINUM ALKYLS AND ALUMINUM-ALKYL DERIVATIVES
Georg Iwantscheff and Richard Dötzer, Nurnberg, Germany, assignors to Siemens-Schuckertwerke Aktiengesellschaft, Berlin-Siemensstadt, Germany, a corporation of Germany
No Drawing. Filed Apr. 12, 1961, Ser. No. 102,386
Claims priority, application Germany Apr. 16, 1960
1 Claim. (Cl. 75—84.5)

Our invention relates to the production of gallium and has as its object to provide an improved method of producing gallium considerably more economical than previously possible.

We produce gallium by separating it from the residues resulting from the production of aluminum alkyls and aluminum-alkyl derivatives.

Aluminum alkyls and their derivatives are used as catalysts in olefine chemistry, and to some extent as fuel additives for better ignition. The production of these compounds is essentially based upon the following two processes.

Alkylaluminumsesquihalides are produced in accordance with the reaction:

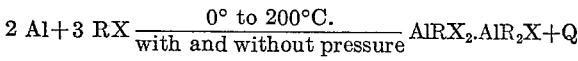

$$2\ Al + 3\ RX \xrightarrow[\text{with and without pressure}]{0° \text{ to } 200°C.} AlRX_2 \cdot AlR_2X + Q$$

wherein R is an alkyl, $R_2$ is an alkyl, halogen or hydrogen, X is a halogen and Q is an energy quantity. This reaction affords the production of methyl-, ethyl-, and propyl-aluminumsesquihalides which can be converted into Al-dialkylhalides, Al-alkyldihalides and Al-trialkyls. They are particularly important for catalytic processes. Of particular significance are the methyl compounds because these compounds cannot be prepared by the process mentioned hereinbelow.

The second process, the so-called aluminumalkyl pressure synthesis, leads to Al-trialkyls though alkyl-aluminumhydride intermediates. The Al-trialkyls are valuable as catalysts and also for preparative purposes.

Both of the processes require metallic aluminum as a starting material. There are no particular purity demands on the metallic aluminum except that the surface be free of oxide. For that reason, industrial aluminum obtained by the cryolite-molten-bath electrolysis is of sufficient purity. This aluminum contains a number of impurities that can be ascertained spectroscopically. The following impurities are present in proportions of more than $10^{-4}\%$:

Cu, Fe, Ga, Mg, Mn, Ni, Pb, Si, Ti, V, Zn

These elements behave differently from aluminum in the above-mentioned reaction conditions and do not enter into the conversion of aluminum. The elements, therefore, concentrate in the residue without change or in the form of compounds, for example insoluble halides. Concentrations of elements, which at first were not analytically ascertainable in the basic metal, but which now are present above the ascertainable minimum, are also found in the residue. These enriched elements are: Ag, Co, In, Mo, Sn, Zr.

It has been discovered, and forms a basis of our invention, that the above-mentioned residues also contain enriched concentrations of the elements Ga, In, Mg, Pb, Si, Sn, Zn, despite the fact that these elements are capable of forming stable metal alkyls and can individually react with alkylhalide.

Our invention, therefore, utilizes the just mentioned discovery for the purpose of producing gallium by recovering it from the residues resulting from the production of aluminum alkyls and aluminum-alkyl derivatives. According to another, more specific feature, we separate gallium from the residues resulting from the production of alkyl-aluminumsesquihalides or from the aluminum-alkyl pressure synthesis.

The production method of the invention is particularly important in view of the fact that although the other elements in the residue can be economically produced by other methods and means, the instant invention presents a method of producing gallium more economically than heretofore known. Gallium constitutes an essential constituent in electronic semiconductor substances as well as a doping agent in the production of other semiconductor materials of extrinsic conductance.

The gallium can be separated from the residues by any suitable and known physical or chemical method. Examples of physical separating techniques are:

Utilization of density differences in liquids and in gases, e.g. eddy-layer methods, centrifugal extraction, evaporation, sublimation, and distillation.

Also applicable are chemical methods for separating the gallium from the slime. Examples of such methods are:

Separation by partial oxidation, amalgamating and/or alloy formation, electrochemical process and partial dissolving reactions.

Of particular interest are the reactions of the gallium with halogens and halogen hydrides. For example, the gallium contained in the residues is converted to a gallium halide and then dissolved in hydrocarbon solvents, as pentane and/or hexane and/or heptane, leaving in the slime the corresponding halides of aluminum and indium. Thereafter, the gallium can be recovered from the solution in known manner for example by electrolytic processing. This method advantageously utilizes the discovered relatively high solubility of the gallium halides, as compared to the corresponding halides of aluminum and indium.

Moreover, physical and chemical methods for separating gallium from the residues can be combined. One or more of the above-mentioned physical methods can be combined with one or more of the above-mentioned chemical methods.

For storing and transporting the residues, it is preferable to humidify or cover these residues with alkylhalides and/or Al-alkyls (Al-triisobutyl and/or Al-triethyl).

The following example is given to illustrate, but not to limit, the scope of the present invention.

Example

A residue resulting from the production of ethyl-aluminumsesquichloride was found to contain the following elements other than aluminum (approximate amounts in p.p.m.).

| | |
|---|---:|
| Cu | 300 |
| Fe | 8200 |
| Ga | 1500 |
| In | 30 |
| Mg | 180 |
| Mn | 60 |
| Mo | 50 |
| Ni | 300 |
| Pb | 460 |
| Si | 2000 |
| Sn | 40 |
| Ti | 20 |
| V | 250 |
| Zn | 490 |
| Zr | 520 |

The sludge was freed of adhering aluminum alkyl halide by washing with benzol (benzene) and was then dried under oxygen and exclusion of humidity. Thereafter the dried sludge was heated in an HCl current at 300 to 600° C. to produce the corresponding halide. The chlorides of gallium, indium and aluminum are volatile in this temperature range and produce a yellowish sublimate constituting about 70% of the heated sludge. The sublimate was extractively treated with n-hexane (boiling point 68° C.). Due to the above-mentioned discovery of the high preferential solubility of gallium chloride, one liter of saturated solution at 60° C. contains 1.35 g. of $AlCl_3$, 1230 g. $GaCl_3$ and only 0.17 g. $InCl_3$. This makes it a simple process to separate $GaCl_3$ from the $AlCl_3$ and $InCl_3$ and to obtain gallium chloride in solid form after distilling off the solvent. The $GaCl_3$ can then be processed to obtain gallium in any known manner, e.g. by electroylsis of an alkaline solution.

In the above-mentioned processing of the metal halides, another hydrocarbon may be used in lieu of n-hexane, for example pentane, heptane, cyclohexane or methylcyclohexane.

Aluminum residues of similar composition are obtained when converting commercial aluminum with chloromethane ($CH_3Cl$). In such a residue, a gallium proportion of 360 p.p.m. was ascertained.

The processing of a residue resulting from the aluminumalkyl pressure synthesis can be performed in exactly the same manner as in the above-described example. For example, a sludge resulting from the production of aluminumdiisobutylhydride (method according to Prof. Ziegler) was found to contain 920 p.p.m. gallium. The other constituents were present in magnitudes similar to those given in the above-described example.

We claim:

The method of producing gallium, which comprises separating gallium from the elements in the residues resulting from the production of aluminum alkyls and aluminum alkyl derivatives by heating said residue in an HCl current to convert the elements in said residue to the respective chlorides, dissolving said chlorides in a hydrocarbon selected from the group consisting of pentane, hexane, heptane, cychohexane and methylcyclohexane and mixtures thereof, whereby the gallium chloride is concentrated, distilling off the solvent, and recovering gallium from the solution.

References Cited in the file of this patent

UNITED STATES PATENTS

| | | |
|---|---|---|
| 1,576,083 | Boyer | Mar. 9, 1926 |
| 2,791,499 | Clegg et al. | May 7, 1957 |

OTHER REFERENCES

Powell et al.: Journal of Applied Chemistry, December 1, 1951, pp. 541–551.

Thorpe et al.: Thorpe's Dictionary of Applied Chemistry, 4th edition, vol. V, pp. 418–420.